(12) United States Patent
Moore

(10) Patent No.: US 11,876,363 B2
(45) Date of Patent: Jan. 16, 2024

(54) AUDIO VIDEO CABLE HOLDER

(71) Applicant: Eric Wilfred Moore, Los Angeles, CA (US)

(72) Inventor: Eric Wilfred Moore, Los Angeles, CA (US)

(*) Notice: Subject to any disclaimer, the term of this patent is extended or adjusted under 35 U.S.C. 154(b) by 155 days.

(21) Appl. No.: 17/669,356

(22) Filed: Feb. 11, 2022

(65) Prior Publication Data
US 2023/0261456 A1 Aug. 17, 2023

(51) Int. Cl.
H02G 3/32 (2006.01)
H02G 3/04 (2006.01)

(52) U.S. Cl.
CPC ............ *H02G 3/32* (2013.01); *H02G 3/0456* (2013.01)

(58) Field of Classification Search
CPC .............................. H02G 3/32; H02G 3/0456
USPC ......................................................... 174/480
See application file for complete search history.

(56) References Cited

U.S. PATENT DOCUMENTS

| 3,508,730 A * | 4/1970 | Knezo, Jr. ................. | F16L 3/26 |
| | | | 24/339 |
| 6,203,376 B1 * | 3/2001 | Magajne ............ | H01R 13/5845 |
| | | | 439/465 |
| 2018/0284356 A1 * | 10/2018 | Haase ................... | G02B 6/3885 |

* cited by examiner

*Primary Examiner* — Timothy J Thompson
*Assistant Examiner* — Michael F McAllister
(74) *Attorney, Agent, or Firm* — Fulwider Patton LLP

(57) ABSTRACT

A unitary molded audio/video cable holder is disclosed that is easily linked to similar cable holders using ends that cooperate in a male/female relationship. Each cable holder comprises rows of recesses that each hold a cable and include retention structures to releasably hold the cables in their respective recess. The holders further may include windows adjacent the recesses to receive a zip tie to keep the cables in the holder where the cables care moved, twisted, or otherwise subjected to forces that would otherwise pull the cables from the holder. The capability of the holders of the present invention to interlock and expand allows the invention to hold an unlimited number of cables easily and safely. Fastener bores facilitate the holders being mounted to a wall or other flat surface.

15 Claims, 8 Drawing Sheets

AUDIO VIDEO CABLE HOLDER

BACKGROUND

Currently in the entertainment industry, audio/video cables that connect to various apparatus can be plentiful and if not properly tended to can become tangled and a safety risk, as well as being unsightly. To prevent these occurrences, cables are typically bundled together with zip ties or the like to lessen the risk of becoming a tripping hazard. Zip ties, however, have their own disadvantage in that they do not easily permit cables to be removed, added, or substituted as is frequently necessary in some situations. For example, a "swing set" requires that some cables must be moved between sets; also if one cable fails, it must be replaced. Zip ties are inconvenient because they usually must be destroyed to access the cables. Collecting cables into a bundle can also lead to signal interference and/or signal corruption, and loss of signal quality.

Velcro strips is another alternative to zip ties for bundle runs of multiple cables. However, they do not solve the problem of signal interference and they cannot themselves be affixed to a surface, so additional clips or hooks are then needed to hold the cables against a flat surface or off the floor. These ties lack any organization and can separate easily if the cables are pulled or twisted. What is needed is a multiple cable organizer that can be permanently or temporarily attached to a support surface, that is reusable, and can aid in organizing the cables.

SUMMARY OF THE INVENTION

The present invention is a unitary molded cable holder that can be easily linked to similar cable holders using ends that cooperate in a male/female relationship. Each cable holder comprises rows of recesses that each hold a cable and include retention structures to releasably hold the cables in their respective recess. The recesses alter the elevation that adjacent cables exit the holder to stagger the cables while providing easy visualization of the cables and preventing signal interference. The holders further may include windows adjacent the recesses to receive a zip tie to keep the cables in the holder where the cables care moved, twisted, or otherwise subjected to forces that would otherwise pull the cables from the holder. The capability of the holders of the present invention to interlock and expand allows the invention to hold an unlimited number of cables easily and safely. Fastener bores facilitate the holders being mounted to a wall or other flat surface.

DETAILED DESCRIPTION OF THE PREFERRED EMBODIMENTS

Figure 1:
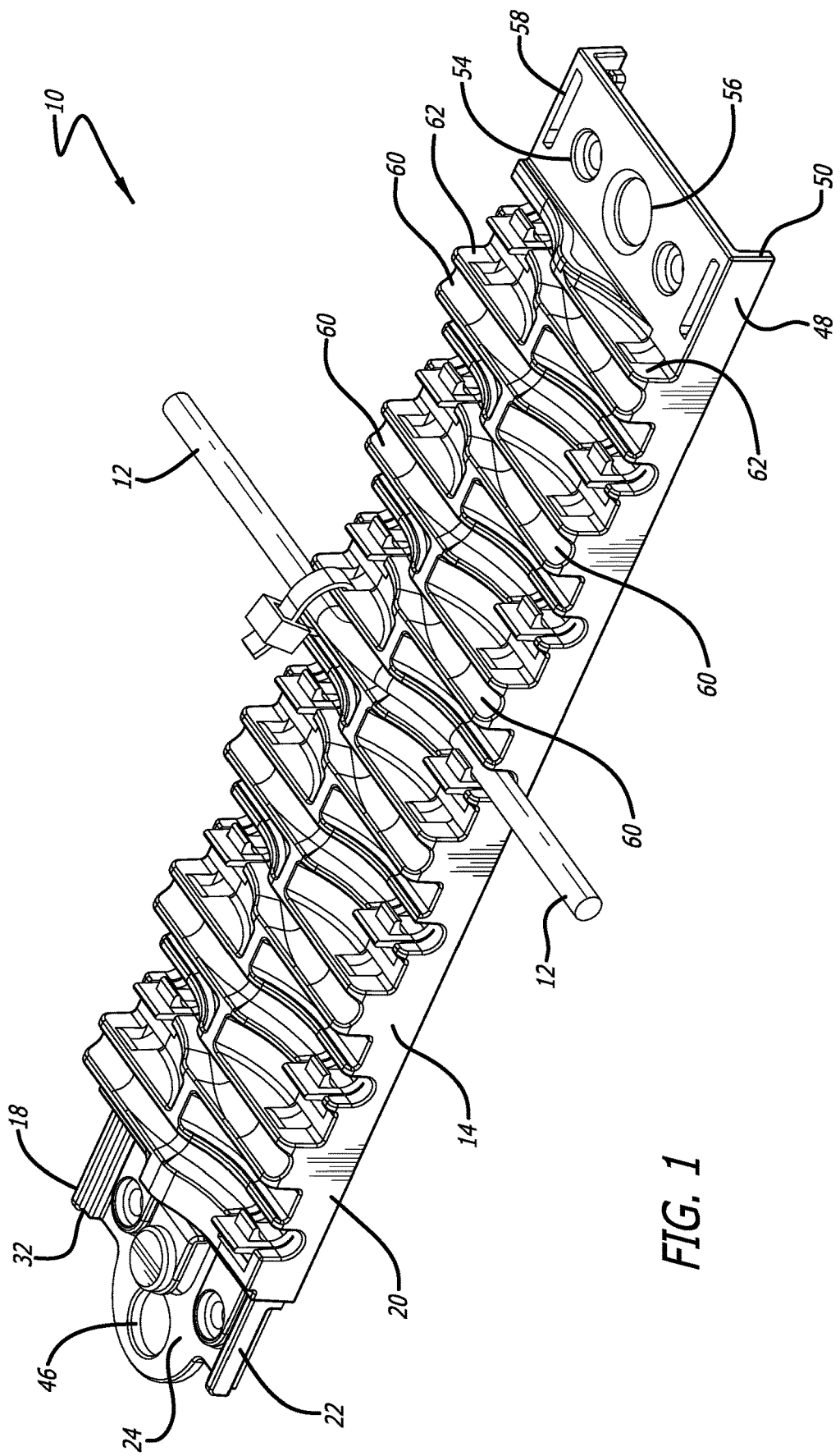
FIG. 1 is an elevated, perspective view of a first embodiment of the present invention.
Figure 2:
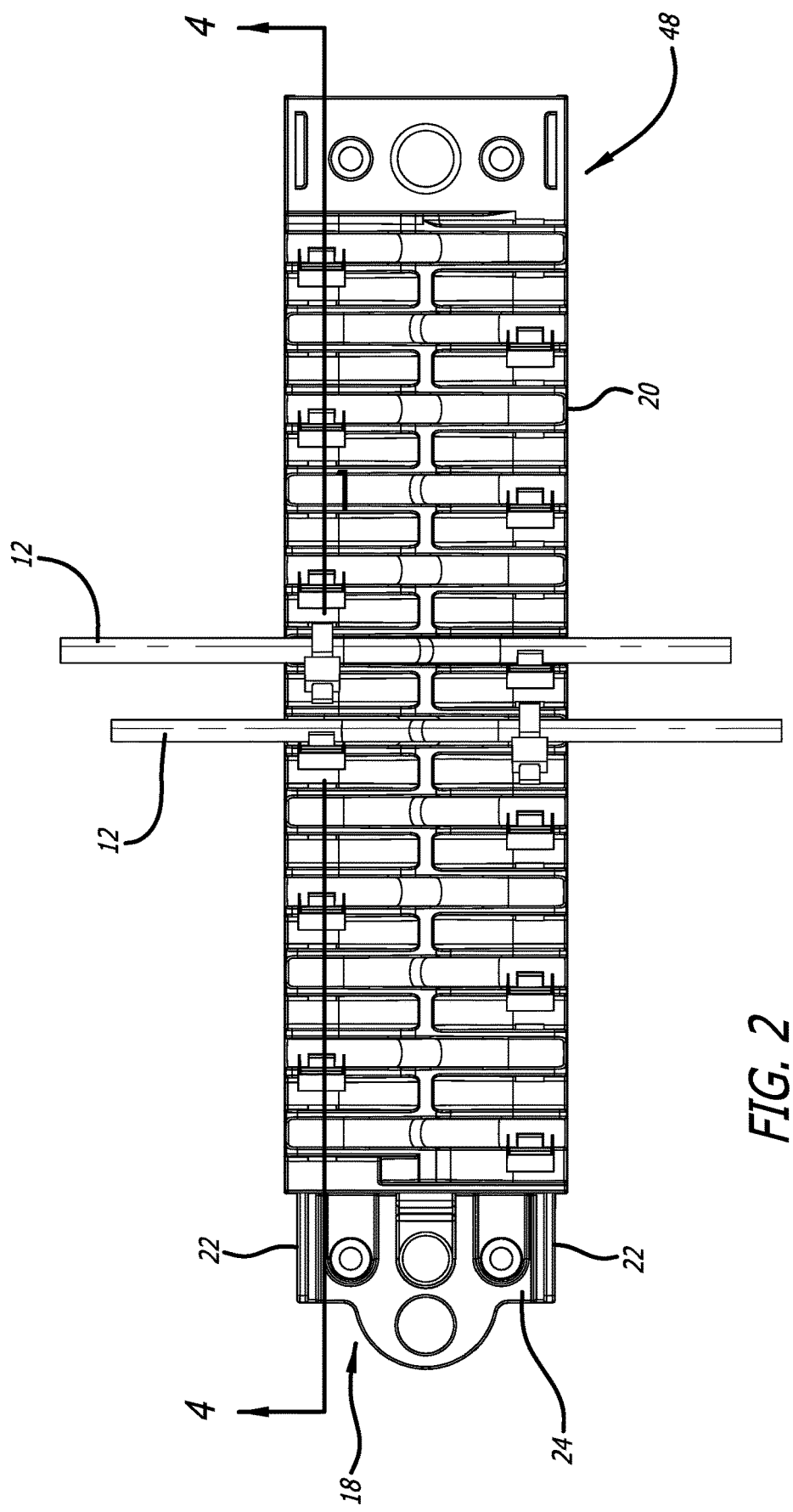
FIG. 2 is a top view of the embodiment of FIG. 1.

A first preferred embodiment of the present invention is shown in FIG. 1, which depicts a cable holder 10 that can be used with different sized cables 12 and permits easy access to any selected cable on the holder (the embodiment shown has been found to work particularly well with data cables). The holder 10 is formed of a non-conductive and non-magnetic material such as a heavy polymer that can be readily molded into a unitary device. The cable holder 10 may take the shape of a block having a substantially rectangular planform (see FIG. 2) with smooth, perpendicular sides 14 and a flat bottom surface 16 (FIG. 4) that facilitates mounting the holder 10 to a wall or other planar mounting surface. The ends of the cable holder 10 are formed with interlocking male and female aspects that allow multiple cable holders 10 to be linked together, as shown in FIG. 5.

The male end 18 (best shown in FIG. 6) projects from a body 20 of the holder and includes a platform 24 extending from the body 20 that supports a pair of distally projecting inset rails 22. The rails 22 project away from the body 20 with rounded upper ends 26 and flat outer surfaces 28 that are configured to act as guides when inserted into complimentary slots on the female end of a second cable holder. The rails 22 may further include a void 30 on a lower edge so each rail 22 is narrower at the end than at its point of attachment to the body 20. The inwardly directed surface of the rails 22 may include a stepped formation 32 from the upper edge to the platform 24 to aid in the position of the male end and provide greater rigidity to the rails 22.

The platform 24 of the male end has formed on its upper surface a pair of reinforced tabs 34 into which fastener bores 36 are formed so that the cable holder 10 is easily mounted to a wall or mounting surface. Between the tabs 34 and centered on the platform 24 is lug 38 cantilevered to the body 20 so as to have some flex in a vertical direction. The upper surface 40 of the lug 38 supports a circular, upwardly projecting button 42 that is sized to slightly interfere with the female end unless the button 42 is depressed, rocking the lug 38 downward so that the male end 18 can enter the female end 48. When the male end of the cable holder is inserted into a female end of a second cable holder, the upwardly projecting button 42 flexed upward to engage with and lock into a complimentary aperture on the female end to releasably lock the two holders together as shown in FIG. 5. The platform 24 may also be formed with a distally projecting semi-circular tongue 44 through which a circular hole 46 is formed. This hole 46 forms an alternative mounting option. The user may choose to hang the cable holder 10 rather than mount it directly to a support structure. Thus the circular hole 46 is adapted to engage one end of an attachment mechanism (not shown) the other end of which is directly or indirectly attached to a support (it has been found that a #8 sash or a carabiner type device works well in this application).

The female end 48 (best shown in FIG. 6) is adapted to receive the male end 18 of a separate cable holder 10 in a releasably locking relationship and comprises a compartment 50 with a flat upper surface 52 and where the housing defines a compartment 51 that may have an open bottom as shown. A pair of fastener bores 54 are sized and positioned to align with the fastener bores 36 of the male end 18 when a male end 18 is inserted into the compartment 50 (see FIG.

5), such that a single fastener (not shown) may pass through both the male and female end bores to lock the two cable holders together, and secure the assembly to a wall or other support surface (not shown). A centrally disposed circular aperture 56 is adapted for use as an alternative mounting option, in a similar manner to circular hole 46. Thus, if the user is unable to mount the cable holder 10 directly to a support surface, indirect mounting can be accomplished via circular hole 46 or circular aperture 56, or both.

Although FIG. 5 only shows two interconnected holder, an unlimited number of larger, integrated holders may be used, which allows one solution to address environments where there are a large number of cables to be contained. The inner walls of the compartment 50 are shaped to receive the rails 22 on the male end with a snug, frictional fit. The depth of the compartment 50 is selected to accommodate the tongue 42 on the male end 18 such that the button 42 is perfectly aligned with the aperture 56 when the male end is inserted into the compartment 50. The upper surface 52 of the compartment 50 may also be formed with slots 58 coincident with the upper edge of the rails 22 and sized to receive a screwdriver head or other such tool to separate the male and female ends should they become stuck. The screwdriver pushes down on the male platform 24 until the button 42 is released from the aperture 56, whereupon the two holders can be separated by sliding the male end 18 from the female end 48.

The body 20 of the cable holder 10 includes an upper surface defining a plurality of transverse parallel grooves or recesses 60 extending the width of the body 20. The recesses 60 preferably have a semi-circular profile that is sized to frictionally receive a cable therein, although the semi-circular arc can be less than or greater than one hundred eighty degrees. Where the arc is greater than one hundred eighty degrees, the recesses can be used as a clamping structure that grips the cable between opposing ends, whereas arcs of less than one hundred eighty degrees typically requires some ancillary locking mechanism to keep the cable 12 in the recess 60, as explained more fully below. Although for ease of illustration the various figures show a limited number of recesses 60, a cable holder can be produced with a greater number of recesses 60 and thus the capability of accommodating a greater number of cables 12.

FIG. 1 shows that each recess 60 is separated into two halves, each half comprising one of two different types: a horizontal half that maintains a constant elevation and a ramped half that begins at the edge of the body at a lower elevation and ramps up (either linearly, concave up, or concave down) to the elevation of the first half. Each recess 60 alternates between three different configurations: straight/ramp; ramp/ramp; and ramp/straight, where the ramp/ramp configuration has about one half the drop in elevation as the straight/ramp configuration. This results in the cables cascading up and down along the length of the holder, so that the cables are vertically offset at adjacent recesses. This offset provides some separation from tightly aligned cables so as to make it easier to identify and extract a specific cable from the cable holder. The creation of three separate elevations for the cable exiting the recesses 60 and the cycling of each elevation so that the intermediate elevation is every other recess and the lower and upper elevations occur every fourth recess is a much more effective use of the space around the holder.

The offset of the recesses also forms sets of parallel ridges 62 separating adjacent recesses. In some ridges 62, a window 64 is formed (see FIG. 3) that forms a path for a cable tie 66 to encircle the cable 12 and attach to the holder 10 at the ridge 62, preventing the cable from escaping the holder. The windows 64 in the ridges 62 are generally near the exit of the recess 60 and a locking element 68 can be placed on the cable tie 66 to maintain tension in the cable tie. In the embodiment of FIG. 1, there is a window 64 located in every other recess 60 so that each cable can be secured to at least one ridge 62.

Figure 3:
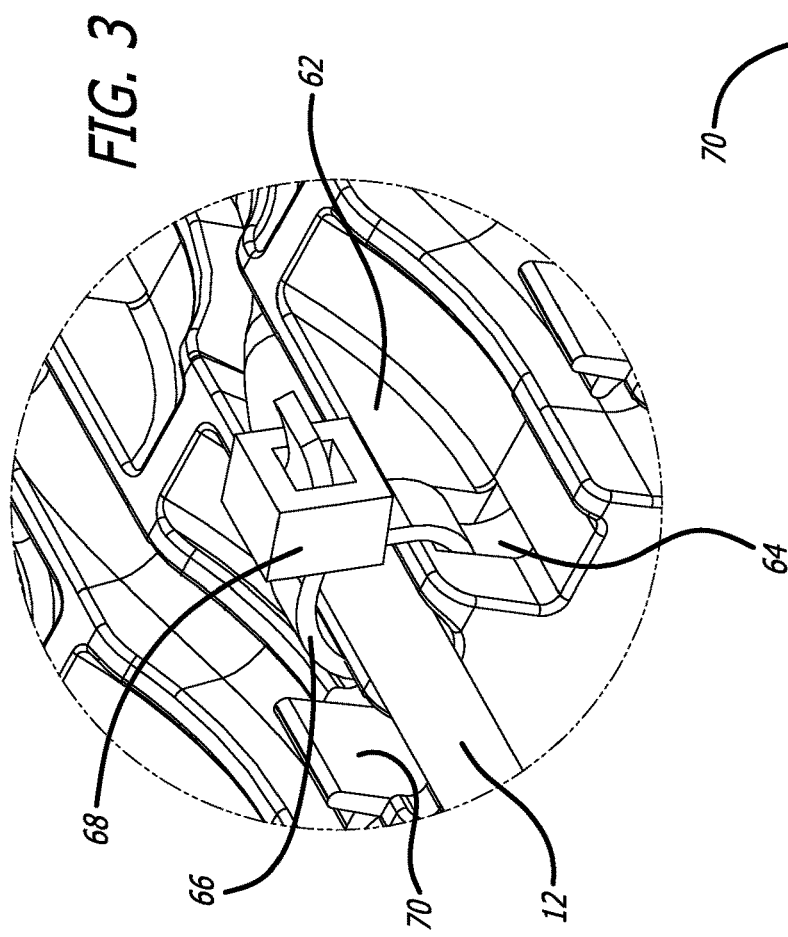
FIG. 3 is an enlarged, perspective view of a cable locking component.
Figure 4:
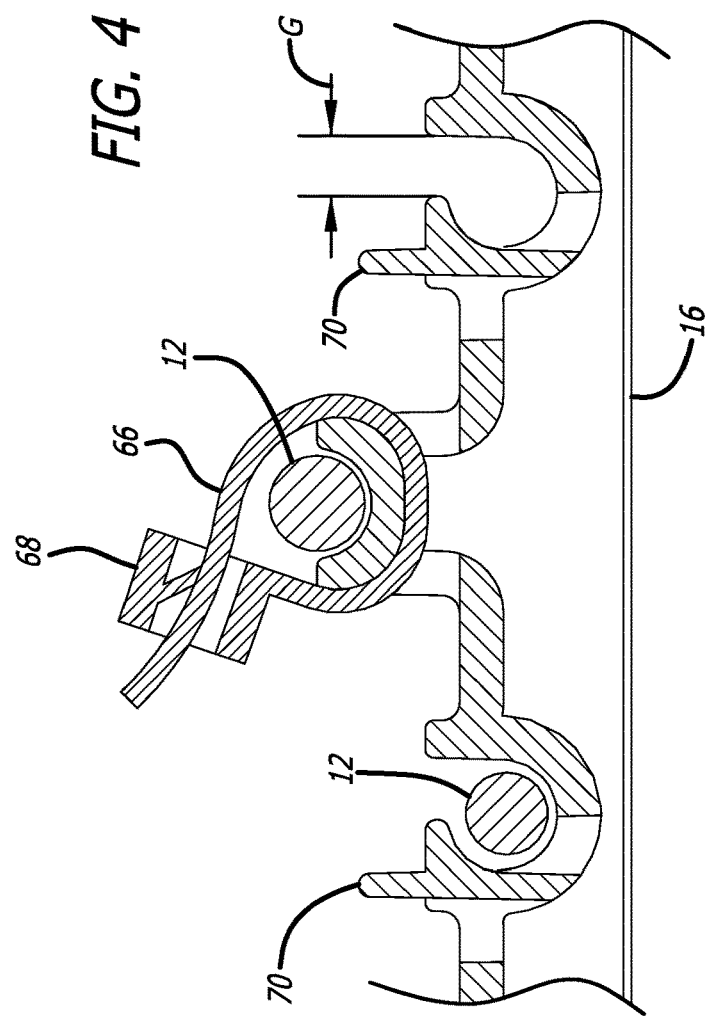
FIG. 4 is a partial cross sectional view taken along line 4-4 of FIG. 2.
Figure 5:
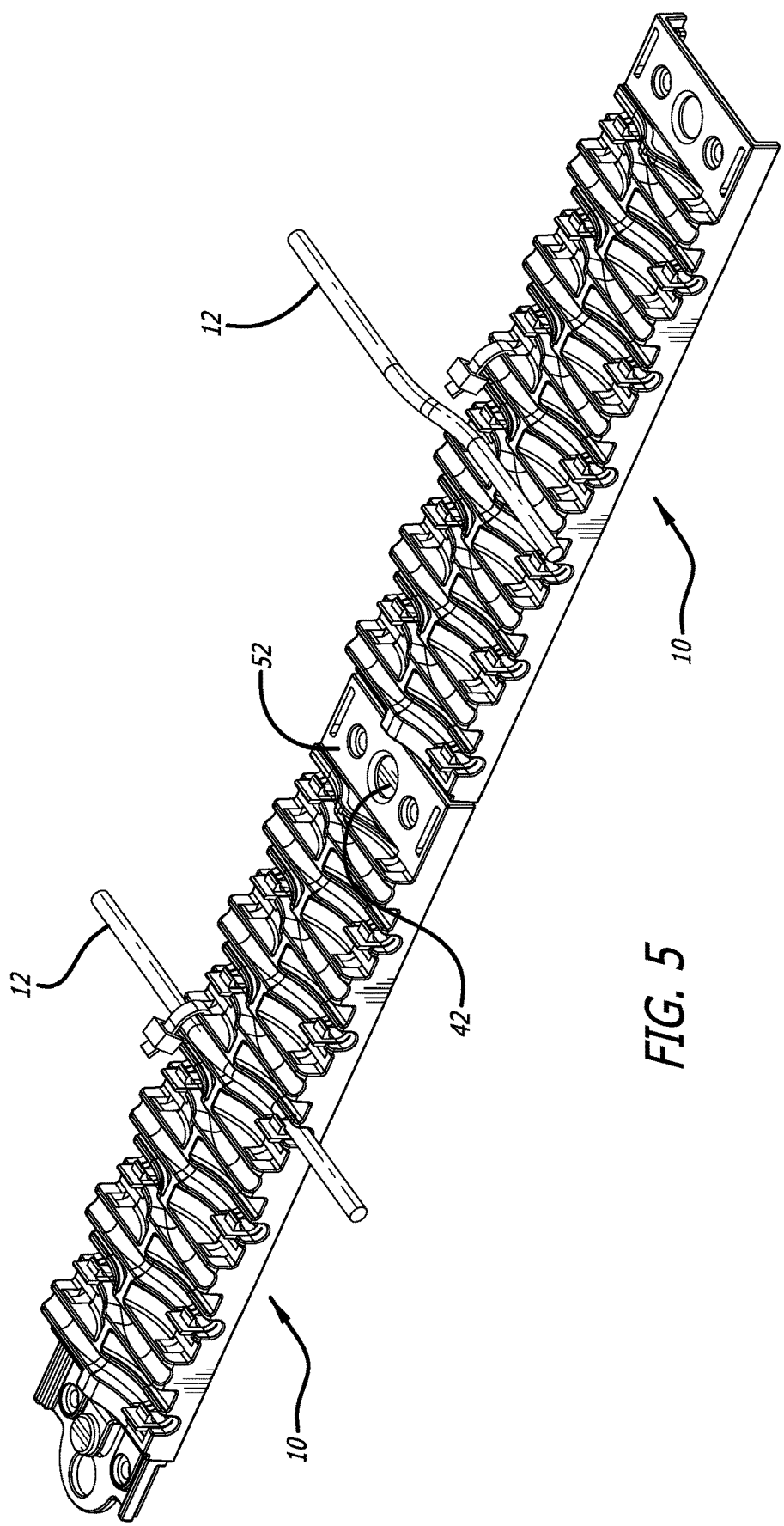
FIG. 5 is an elevated, perspective view of multiple holders coupled together.

In addition to the windows 64 that serve as anchors for the cable ties 66, a plurality of ridges 62 are formed with resilient fingers 70 that enclose a cable 12 inside the recess 60 as shown in FIGS. 3 and 4. The fingers 70 extend above the cable 12 that is seated in the recess 60, leaving a gap G that is smaller than the diameter of the cable 12, precluding the cable from slipping out of the recess. The finger is resilient to allow pressure such as by a finger/thumb to temporarily displace the finger 70 to allow the cable to enter the recess 60, and when the pressure is removed the finger returns to its unbiased position to lock the cable inside the recess 60 as shown in FIG. 4. The user may employ a combination of cable ties 66 and the fingers 70 to keep the cables inside the cable holder 10.

Figure 6:
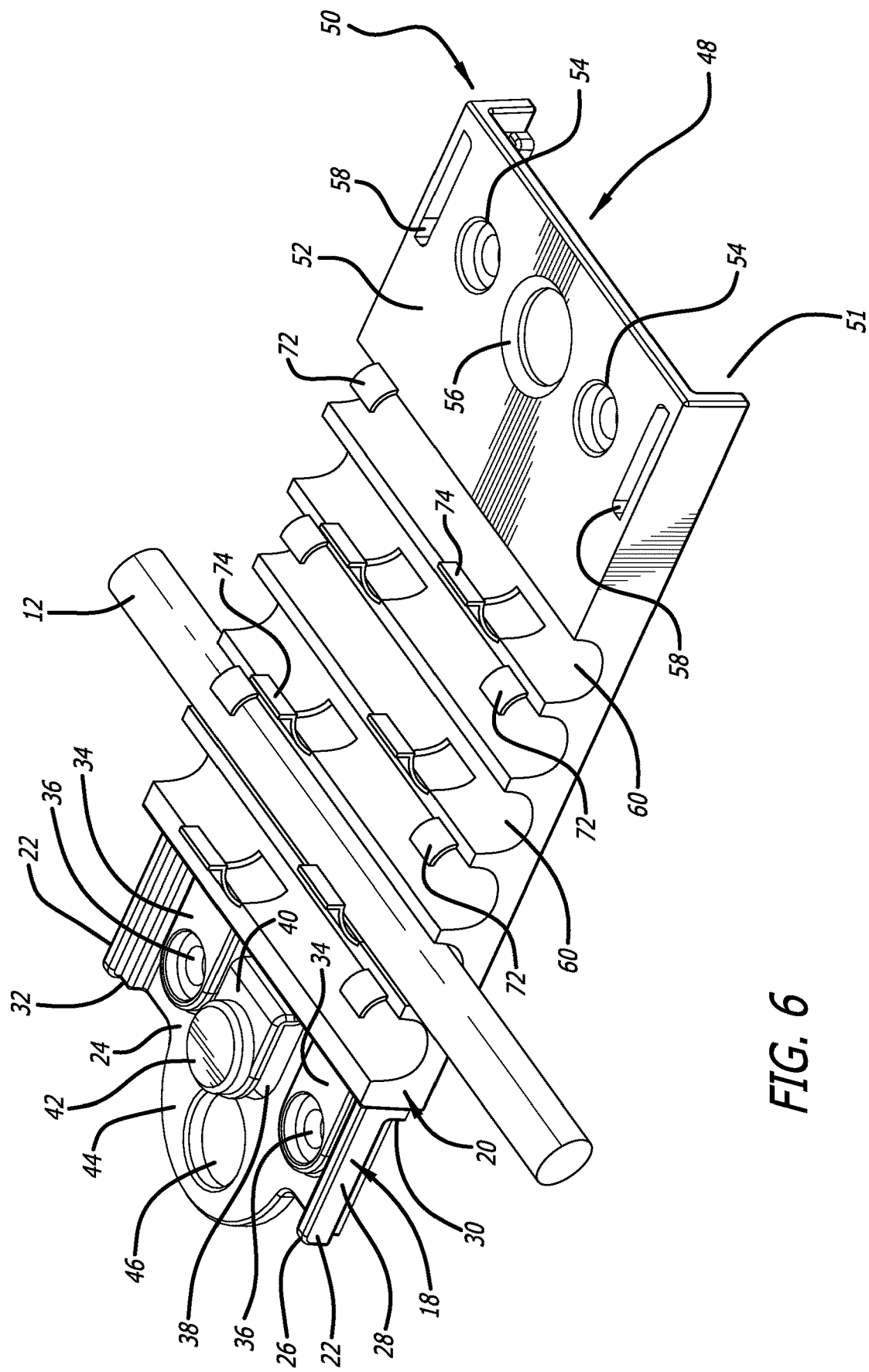
FIG. 6 is an elevated, perspective view of a second embodiment of the present invention.
Figure 7:
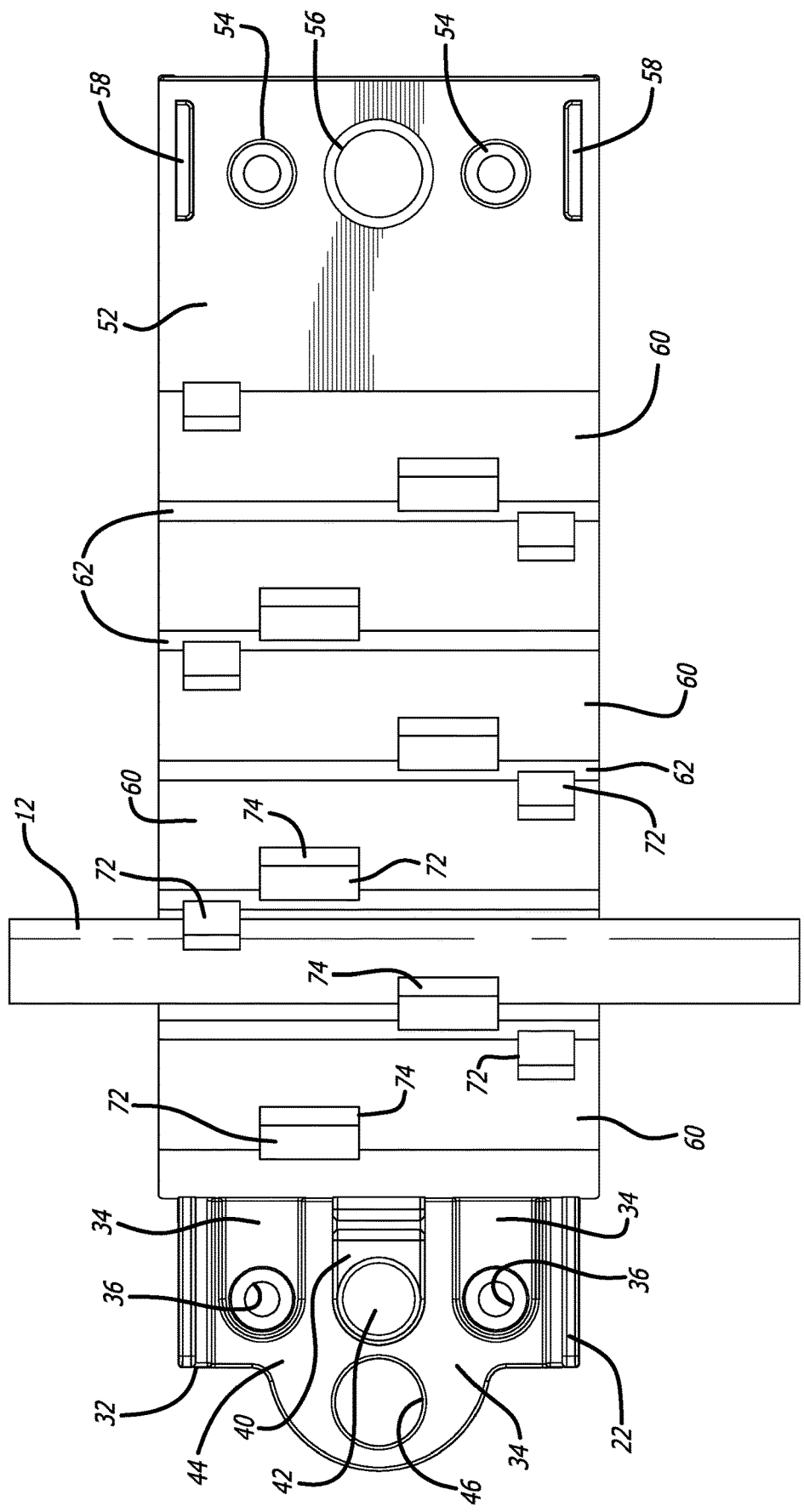
FIG. 7 is a top view of the embodiment of FIG. 6.
Figure 8:
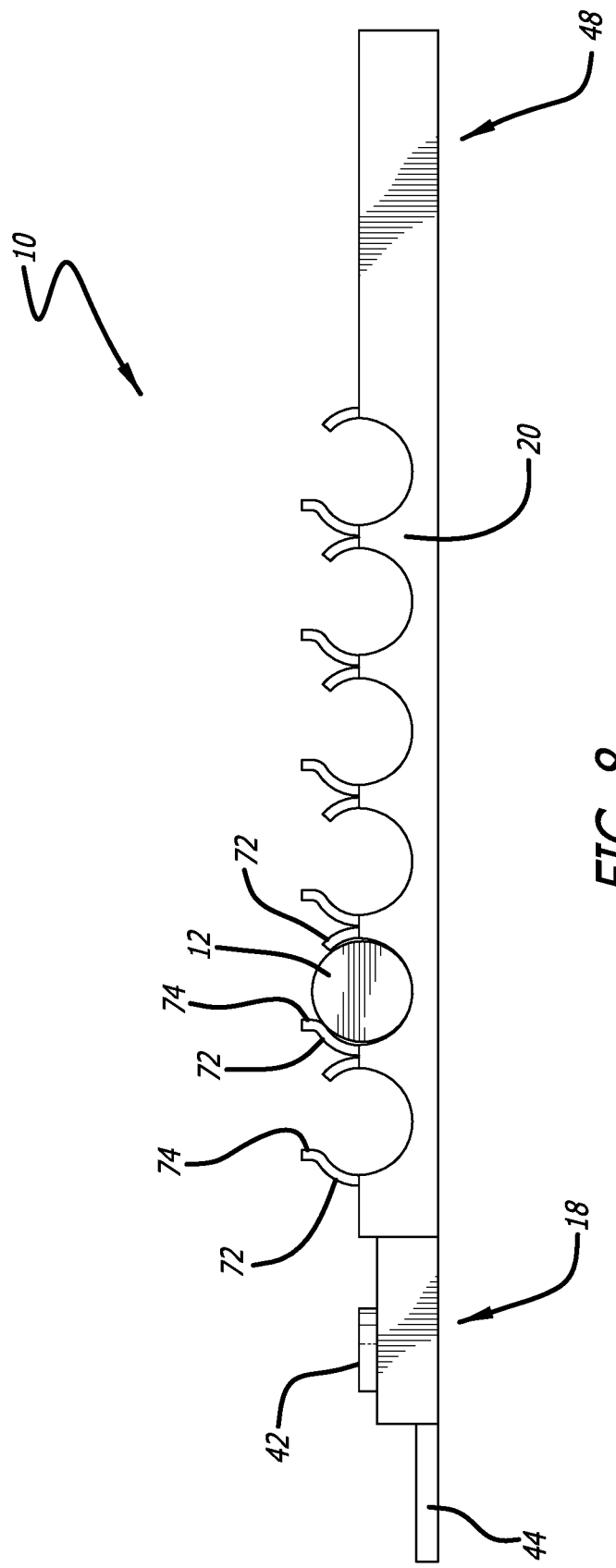
FIG. 8 is a side view of the embodiment of FIG. 6.
Figure 9:
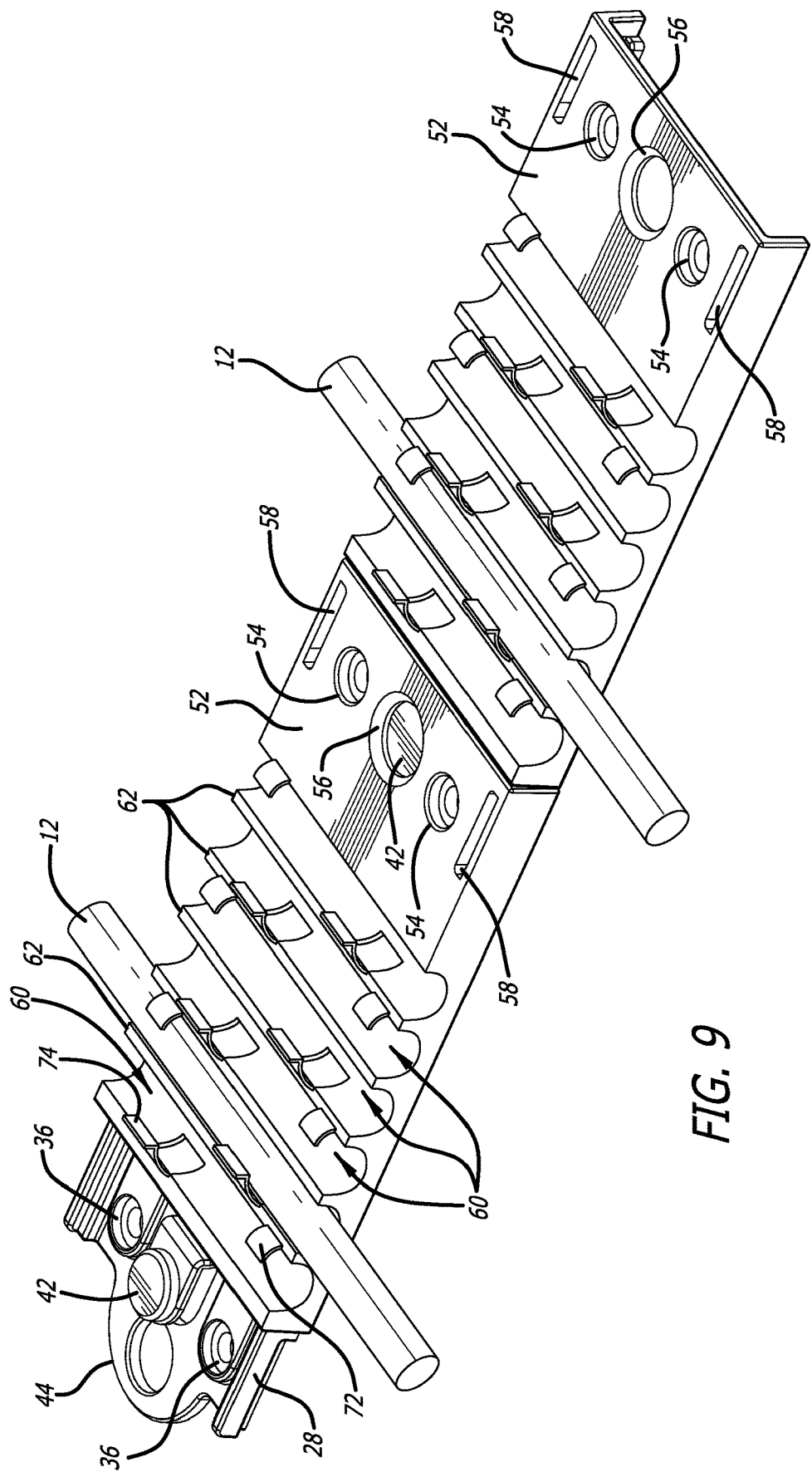
FIG. 9 is an elevated, perspective view of multiple holders coupled together.

In an alternate embodiment as shown in FIG. 6, each recess 60 can be formed with alternating arcuate tabs 72 that project resiliently over the cable 12 while the cable sits in the recess 60. There are no windows for cable ties, since the arcuate tabs 72 at each end of the recess sufficiently retain the cable in its respective recess. With each pair of arcuate tabs 72, one tab may be formed with a vertical lip 74 that serves as a location to retract the tab away from the recess to permit the cable to be removed from the holder. This embodiment has been found to work particularly well with 12-3 or 18-3 cables.

I claim:

1. A unitary molded cable holder, comprising:
a body having a substantially flat bottom surface and an upper surface formed with parallel recesses extending across a width of the body, said recesses configured to stagger an elevation of adjacent cables entering and exiting the cable holder; and
first and second ends configured to attach to respective second and first ends of another cable holder;
wherein each recess includes at least one retention structure to releasably capture a cable in the recess.

2. The unitary molded cable holder of claim 1, wherein the recesses are semi-circular in profile.

3. The unitary molded cable holder of claim 1, wherein the first end includes a protrusion and the second end includes a compartment that is configured to receive the protrusion of the first end in a male/female relationship.

4. The unitary molded cable holder of claim 3, wherein the first end includes an upwardly projecting button that is sized to be received in an aperture in the second end when the first end is inserted in the second end, the insertion of the button in the aperture releasably locking the first end in the second end.

5. The unitary molded cable holder of claim 1, wherein the retention structure is a resilient finger that projects over a cable when said cable is seated in a recess.

6. The unitary molded cable holder of claim 1, wherein the retainer structure is an arcuate projection that overlays a portion of a cable when said cable is seated in a recess.

7. The unitary molded cable holder of claim 1, where each recess is divided into two halves, each halve comprising one of a level segment, a shallow arc, and a deep arc.

8. The unitary molded cable holder of claim 7, wherein the recesses alternate between recesses that have a straight segment and a deep arc, and recesses that have two shallow arcs.

9. The unitary molded cable holder of claim 1, wherein the first end and the second end include fastener bores that coincide such that when the first end is connected to the second end, single fasteners pass through bores of both the first end and the second end.

10. The unitary molded cable holder of claim 4, wherein the button is disposed on a lug that is cantilevered to the body of the cable holder.

11. The unitary molded cable holder of claim 1, wherein said recesses are separated by ridges, and selected ridges include windows that permit cable ties to encircle a cable when said cable is seated in a recess.

12. The unitary molded cable holder of claim 1, wherein the first end include distally extending rails inset from said body.

13. The unitary molded cable holder of claim 12, wherein said rails include on an inner facing surface a plurality of steps.

14. The unitary molded cable holder of claim 5, wherein the resilient finger includes a vertical tab to facilitate rocking the resilient finger toward and away from the recess.

15. The unitary molded cable holder of claim 1, wherein the first end includes a semi-circular tongue projecting distally away from the body.

\* \* \* \* \*